(12) United States Patent
Chou et al.

(10) Patent No.: US 6,592,100 B2
(45) Date of Patent: Jul. 15, 2003

(54) VALVE MOUNTING STRUCTURE OF FUEL TANK

(75) Inventors: Tsuyoshi Chou, Wako (JP); Masaaki Horiuchi, Wako (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/855,764

(22) Filed: May 16, 2001

(65) Prior Publication Data

US 2002/0008221 A1 Jan. 24, 2002

(30) Foreign Application Priority Data

May 19, 2000 (JP) ........................................ 2000-147622

(51) Int. Cl.[7] .............................................. F16K 51/00
(52) U.S. Cl. ......................................... 251/144; 137/43
(58) Field of Search ............................ 251/144; 137/43, 137/202

(56) References Cited

U.S. PATENT DOCUMENTS 5,522,417 A * 6/1996 Tomioka et al. ............... 137/43
6,035,883 A * 3/2000 Benjey ........................ 137/202
6,286,539 B1 * 9/2001 Nishi et al. .................. 137/202

FOREIGN PATENT DOCUMENTS

JP 7-293382 11/1995

* cited by examiner

Primary Examiner—Ehud Gartenberg
Assistant Examiner—Melvin A. Cartagena
(74) Attorney, Agent, or Firm—Armstrong, Westerman & Hattori, LLP

(57) ABSTRACT

A float valve mounted to a tank body made of a synthetic resin. A welding flange provided on a cover made of a synthetic resin having a large swelling rate is welded to an outer periphery of an opening defined in an upper wall of a tank body made of a synthetic resin having a large swelling rate, so that the cover covers the opening, and a fixing flange provided at an upper portion of a protector having a small swelling rate for supporting the float case of the float valve by a concavo-convex engagement is fixed between the outer periphery of the opening of the tank body and the welding flange of the cover. The protector is formed of the synthetic resin having the small swelling rate and, hence, it is possible to reliably prevent the float case from being dropped out due to the swelling of the protector. In addition, the protector is fixed with its mounting flange sandwiched between the tank body and the cover and hence, the protector can be fixed firmly, while effectively absorbing a difference between the swelling rates.

1 Claim, 3 Drawing Sheets

VALVE MOUNTING STRUCTURE OF FUEL TANK

BACKGROUND OF THE INVENTION

1. Field of the Invention

The present invention relates to a valve mounting structure for a fuel tank, in which a float valve with floats accommodated in a float case and lifted and lowered in response to the raising and lowering of the level of fuel is mounted to an upper wall of a tank body.

2. Description of the Related Art

There is a structure for mounting a float valve to an upper wall of a tank body of a fuel tank for an automobile, which is described in Japanese Patent Application Laid-open No.7-293382, and in which the float valve is inserted into the tank body through an opening defined in the upper wall of the tank body, and a flange formed on an outer peripheral surface of the float valve is placed into abutment against an outer periphery of the opening with a seal member interposed therebetween, and is bolted to the outer periphery of the opening.

There is also a known structure for mounting a float valve to a fuel tank having a tank body made of a synthetic resin, in which the float valve made of a synthetic resin is fitted to an inner periphery of a cover made of a synthetic resin and coupled to the inner periphery of the cover by a concavo-convex engagement, and is inserted through an opening in an upper wall of the tank body, and the cover is fixed to an outer periphery of the opening by welding.

The tank body in the latter structure is formed of a synthetic resin having a rate of expansion caused by contact with fuel (which will be referred to as a swelling rate hereinafter) greater than that of a body portion of the float valve, and the cover welded to the tank body is also formed of the same material as the tank body in order to ensure a welding strength. Therefore, the latter structure has a problem in that when the cover is swelled by the contact with the fuel and, as a result, the concavo-convex engagement of the cover with the float valve is loosened, the float valve is liable to be dropped out from the cover.

The present invention has been developed with the above circumstance in view, and it is an object of the present invention to reliably mount a float valve to a tank body made of a synthetic resin by welding.

SUMMARY OF THE INVENTION

To achieve the above object, the present invention provides a valve mounting structure of a fuel tank, in which a float valve with floats accommodated in a float case and lifted and lowered in response to raising and lowering of the level of a fuel is mounted to an upper wall of a tank body. A welding flange is provided on a cover made of a synthetic resin is welded to an outer periphery of an opening defined in the upper wall of the tank body made of a synthetic resin so that the cover covers the opening, and a fixing flange provided at an upper portion of a protector for supporting the float case of the float valve by a concavo-convex engagement is fixed between the outer periphery of the opening of the tank body and the welding flange of the cover, the protector having a swelling rate less than those of the tank body and the cover.

With the above arrangement, each of the tank body and the cover is formed of the synthetic resin having a larger swelling rate. Therefore, the tank body and the cover welded to each other swell at the same rate, whereby a load is prevented from being applied to a weld zone. Moreover, because the protector is formed of the material having the swelling rate less than those of the tank body and the cover and, hence, it is possible to reliably prevent the float case from dropping out due to the swelling of the protector. In addition, the protector is fixed with its mounting flange sandwiched between the tank body and the cover, rather than being welded directly to the tank body and the cover. Therefore, even if the swelling rate of the tank body and the cover is different from that of the protector, the protector can be fixed firmly, while effectively absorbing a difference between the swelling rates.

DETAILED DESCRIPTION OF THE PREFERRED EXEMPLARY EMBODIMENT

The present invention will now be described by way of a preferred exemplary embodiment of the present invention shown in the accompanying drawings.

Figure 1:
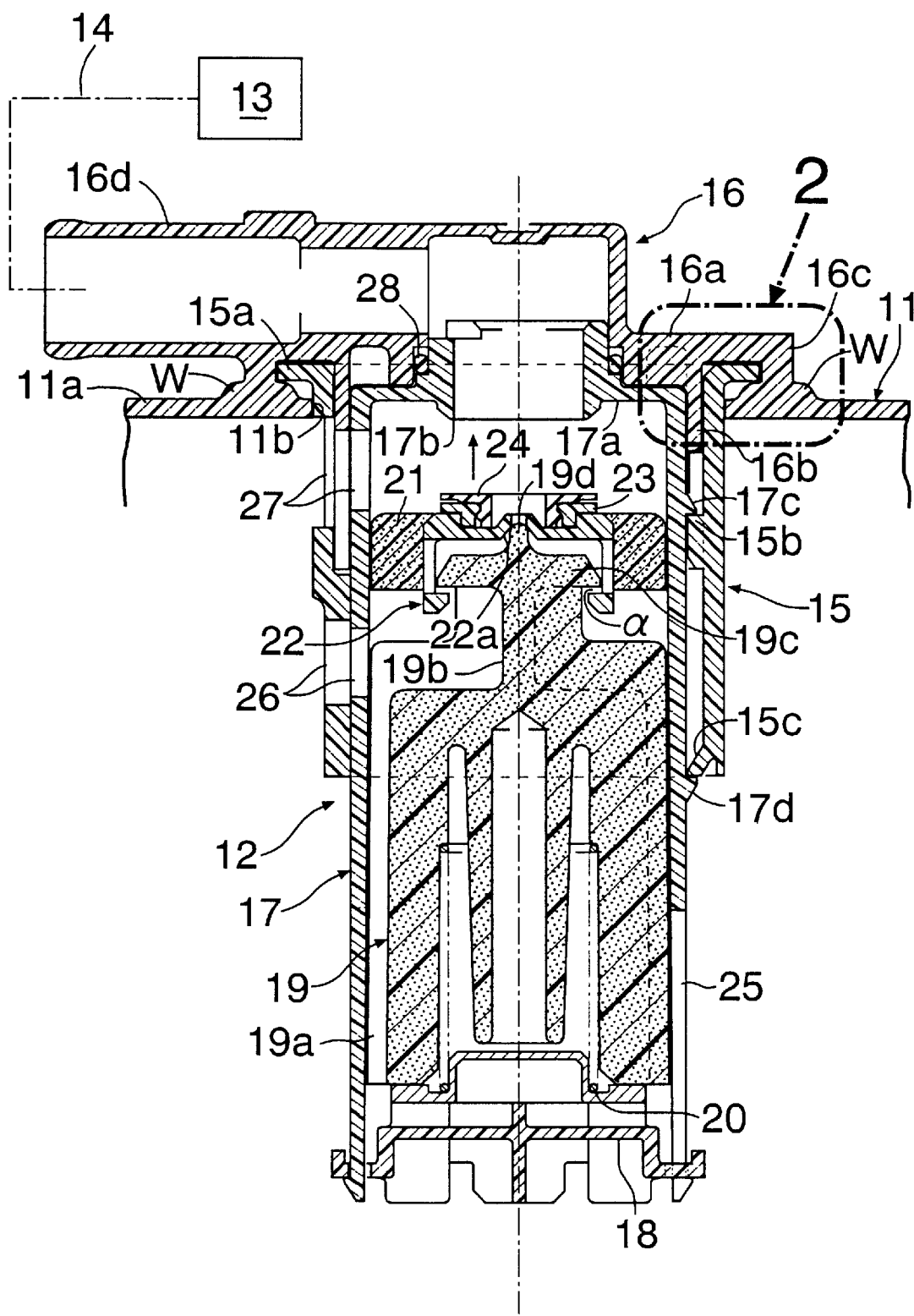
FIG. 1 is a vertical sectional view of a tank body and a float valve.
Figure 2:
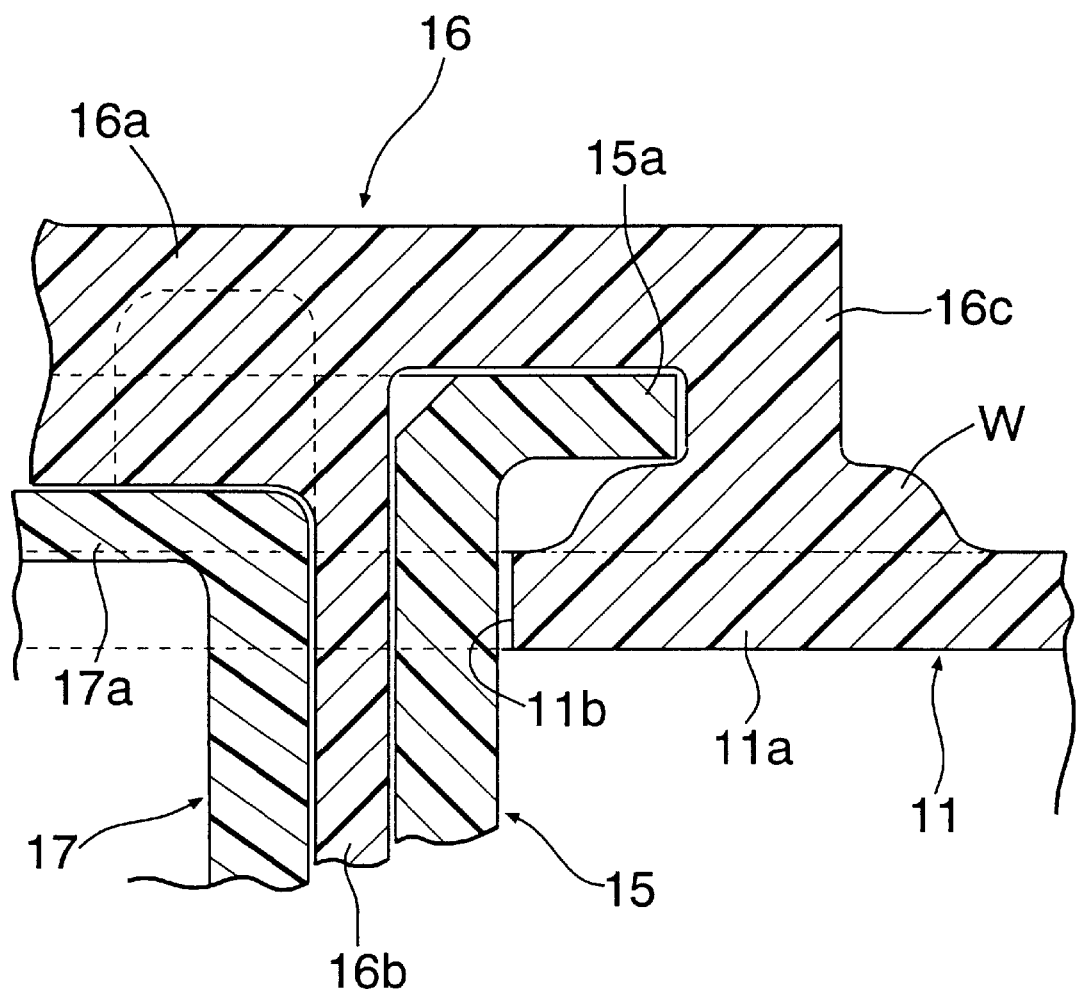
FIG. 2 is an enlarged view of a portion indicated by 2 in FIG. 1.
Figure 3:
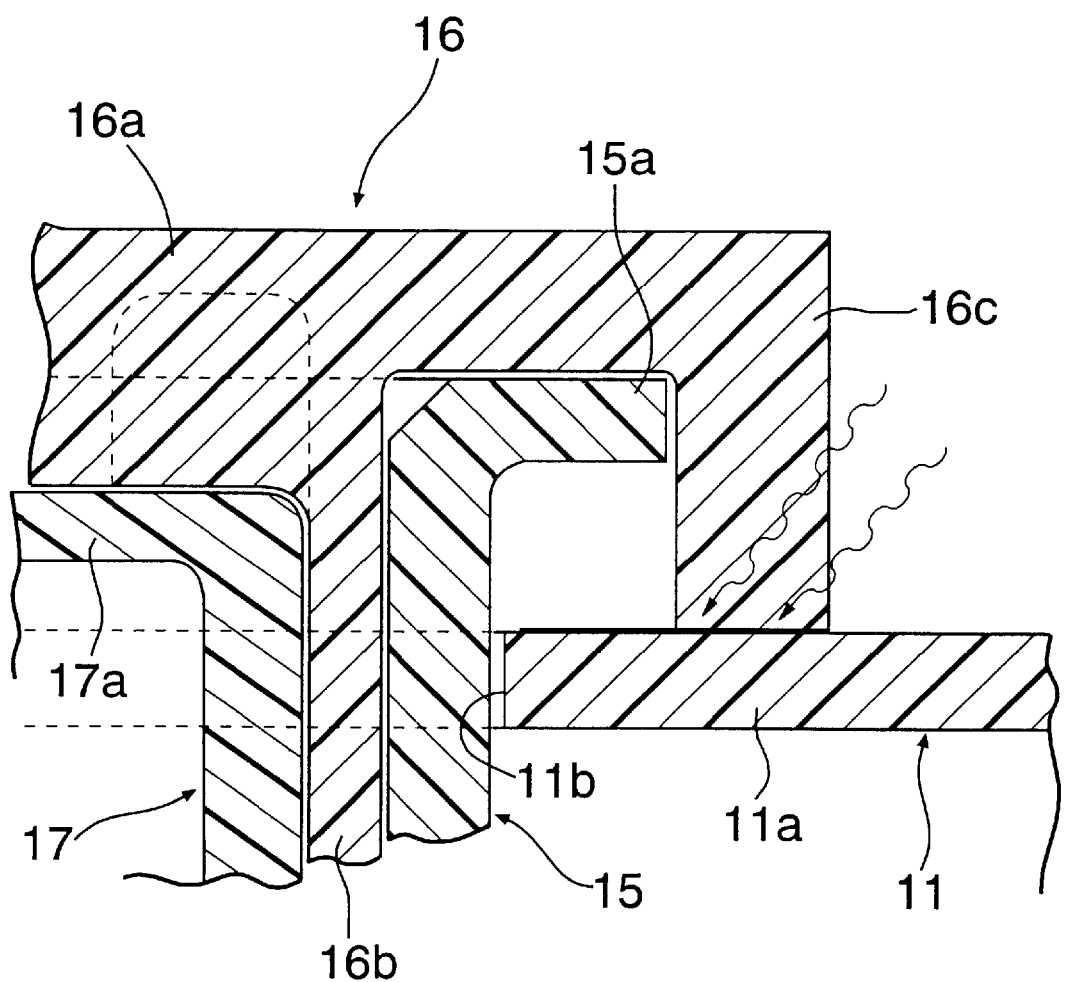
FIG. 3 is a view similar to FIG. 2, but showing a state before welding of a cover.

FIGS. 1 to 3 show a preferred exemplary embodiment of the present invention, where FIG. 1 is a vertical sectional view of a tank body and a float valve; FIG. 2 is an enlarged view of a portion indicated by 2 in FIG. 1; and FIG. 3 is a view similar to FIG. 2, but showing a state before welding of a cover.

As shown in FIG. 1, a fuel tank for an automobile includes a tank body 11 formed of a synthetic resin by blow molding, and a float valve 12 is mounted in a circular opening 11b defined in an upper wall 11a of the tank body 11. When the level of a fuel within the tank body 11 is raised to nearly a full level upon supplying of the fuel, the float valve 12 closes a charging passage 14 for supplying a fuel vapor to a canister 13, thereby raising the level of the fuel in a filler pipe to operate an auto-stopping device for a fuel-supplying gun. When a vehicle is overturned, whereby the level of the fuel in the tank body 11 is varied greatly, the float valve 12 closes to prevent the fuel from flowing out through the charging passage 14. Because the float valve 12 cannot be mounted from the inside of the tank body 11, the float valve 12 is inserted through the opening 11b of the tank body 11 in a state in which it has been brought into concavo-convex engagement with a protector 15 made of a synthetic resin, and a cover 16 made of a synthetic resin is mounted outside the float valve 12 and fixed to the float valve 12 by a high-frequency welding.

The float valve 12 includes a bottomed cylindrical float case 17. A cylindrical valve seat 17b is formed at a central portion of an upper wall 17a integrally connected to an upper end of the float case 17, and a bottom plate 18 is locked in an opening at a lower end of the float case 17. A lower float 19 of the float valve 12 is guided on an inner surface of the float case 17 to enable the lifting and lowering movements of a plurality of ribs 19a formed on an outer peripheral surface of the lower float 19, and is urged upwards by a coil spring 20 disposed between the lower float 19 and the bottom plate 18. A head portion 19c is formed at an upper portion of the lower float 19 with a neck portion 19b formed therebelow. An upper float 21 is mounted at the head portion 19c for relative vertical movement, so that it is liftably and lowerably guided on the inner surface of the float case 17. More specifically, a housing 22 is fitted to an inner periphery of the upper float 21 formed in an annular shape, and the head portion 19c of the lower float 19 is fitted in the housing 22, so that the head portion 19c can be lifted and lowered in a distance corresponding to a minute gap α. A valve member 19d protruding on an upper surface of the heat portion 19c is opposed to a valve seat 22a formed on the housing 22, so that valve member 19d can be seated on the valve seat 22. A valve member 24 is supported by a support member 23 on the upper surface of the housing 22 and opposed to a valve seat 17b provided on the upper wall 17a of the float case 17, so that the valve member 24 can be seated on the valve seat 17b.

The protector 15 fitted over an outer periphery of the float case 17 is a substantially cylindrical member and has a fixing flange 15a integrally formed on its upper surface to extend radially outwards. When the float case 17 having a locking claw 17c and a stop step 17d provided on its outer periphery is inserted from below into the protector 15, the locking claw 17c climbs over a locking step 15b of the protector 15 to come into engagement with the locking step 15b, and a stop projection 15c of the protector 15 is put into abutment against the stop step 17d, whereby the float case 17 is coupled to the protector 15. In order to permit the inside of the lower float 19 to communicate with the inside of the tank body 11, a first communication bore 25 is provided to extend through the float case 17, and second and third communication bores 26 and 27 are provided to extend through the float case 17 and the protector 15.

The cover 16 covering the opening 11b in the tank body 11 includes an annular body portion 16a fitted over an outer periphery of the valve seat 17b of the float case 17 with an O-ring interposed therebetween, a spacer portion 16b formed concentrically outside the body portion 16a and fitted into a clearance between the float case 17 and the protector 15, a welding flange 16c having an L-shaped section to extend radially outwards from the spacer portion 16b and then downwards, and a coupling portion 16d extending radially outwards from the body portion 16a and connected to the charging passage 14. The welding portion 16c is fixed at its lower end to the upper wall 11a of the tank body 11 by welding W.

The operation of the preferred exemplary embodiment of the present invention having the above-described arrangement will be described below.

When the float valve 12 is in an opened state, as shown in FIG. 1, a fuel vapor generated in the tank body 11 is supplied to the canister 13 via the third communication bore 27 defined in the protector 15 and the float case 17, the valve seat 17b of the float case 17, the coupling portion 16d of the cover 16 and the charging passage 14.

When the level of the fuel within the tank body 11 is raised by supplying fuel from the fuel supply gun, the fuel vapor within the tank body 11 is forced out of the tank body 11 via the charging passage 14 to the canister 13. When the level of the fuel reaches a full level, the valve member 24 provided on the upper float 21 lifted by buoyancy is seated on the valve seat 17b provided on the float case 17, and the valve member 19d provided at the heat portion 19c of the lower float 19 is seated on the valve seat 22a provided on the upper float 21, thereby preventing the fuel vapor in the tank body 11 from flowing through the charging passage 14 to the canister 13. As a result, the internal pressure in the tank body 11 is increased to raise the level of the fuel within the filler pipe, thereby operating an auto-stopping device for the fuel supply gun.

When the flow rate of the fuel supplied from the fuel supply gun is larger, the lower float 19 and the upper float 21 are lifted by buoyancy of the fuel vapor pushed by the raised level of the fuel to flow into the charging passage 14 and, hence, the float valve 12 may be closed before the level of the fuel reaches the full level. In such a case where the float valve 12 is once closed, it is retained in its closed state by an increase in internal pressure in the tank as a result of the further raising of the level of the fuel, whereby the auto-stopping device for the fuel supply gun is operated early, so that the fuel cannot be supplied to the full level.

In the present embodiment, however, when the lower float 19 is moved by slight shaking of the fuel, the valve member 19d of the lower float 19 is moved away from the valve seat 22a of the upper float 21, thereby permitting the positive pressure in the tank body 11 to escape into the charging passage 14. Therefore, the valve member 24 of the upper float 21 is moved away from the valve seat 17b of the float case 17, whereby the float valve 12 is brought into its opened state. Thus, it is possible to prevent the auto-stopping device for the fuel supply gun from being operated early, thereby reliably supplying the fuel to the full level.

When the vehicle is overturned and the float valve 12 is submerged under the level of the fuel, the lower float 19 and the upper float 21 are lifted by buoyancy, whereby the valve member 24 provided on the upper float 21 is seated on the valve seat 17b provided on the float case 17, and the valve member 19d provided at the head portion 19c of the lower float 19 is seated on the valve seat 22a provided on the upper float 22. This prevents the fuel within the tank body 11 from flowing out through the charging passage 14 to the canister 13. Even when the vehicle is turned completely sideways, so that the buoyancy in the valve-closing direction does not act on the lower float 19 and the upper float 21, the float valve 12 can be closed without hindrance under the action of the urging force of the coil spring 20.

To mount the float valve 12 having the above-described construction to the tank body 11, the float case 17 of the float valve 12 is inserted from below into the protector 15, whereby the locking claw 17c of the float case 17 is brought into engagement with the locking step 15b of the protector 15, and the stop projection 15c of the protector 15 is brought into abutment against the stop step 17d of the float case 17. Subsequently, the protector 15 and the float valve 12 with the cover 16 mounted thereto are inserted into the tank body 11 through the opening 11b in the tank body 11 (see FIG. 3). In this state, the spacer 16b of the cover 16 is in abutment against the radially inner side of the fixing flange 15a of the protector 15 fitted in the opening 11b of the tank body 11, and the welding flange 16c of the cover 16 is in abutment against the radially outer side of the fixing flange 15a.

Then, the welding flange 16c of the cover 16 is welded at W to the upper wall 11a of the tank body 11 by a high-frequency welding (see FIG. 2). Thus, the fixing flange 15a of the protector 15 is firmly fixed between the spacer portion 16b/the welding flange 16c and the upper wall 11a of the tank body 11 and in this manner, the float case 17 is attached to the tank body 11 through the protector 15.

Each of the tank body 11 and the cover 16 is formed of a synthetic resin having a relatively large swelling rate and, hence, the tank body 11 and the cover 16 integrally connected to each other by the welding are swelled at the same rate, whereby a load is prevented from being applied to the weld zone. The protector 15 is formed of a synthetic resin having a swelling rate smaller than those of the tank body 11 and the cover 16 and hence, it is possible to reliably prevent the float case 17 from being dropped out due to the swelling of the protector 15. Moreover, even if the swelling rate of the tank body 11 and the cover 16 differs from that of the protector 15, the protector 15 can be firmly fixed, while effectively absorbing a difference between the swelling rates, because the protector 15 is fixed with its mounting flange 15a sandwiched between the tank body 11 and the cover 16, rather than being welded directly to the tank body 11 and the cover 16.

Although the preferred exemplary embodiment of the present invention has been described in detail, it will be understood that various modifications may be made without departing from the subject matter of the present invention.

For example, the material for the protector 15 is not limited to the synthetic resin, and may be a metal. The application of the float valve 12 is not limited to the type in the embodiment, and may be of such a type that it is closed in response to the raising of the level of the fuel upon the supplying of the fuel to cut off the communication between the upper portion of the tank body and the neck portion of the filler pipe.

What is claimed:

1. A valve mounting structure for a fuel tank, in which a float valve having floats and accommodated in a float case and lifted and lowered in response to raising and lowering of the level of a fuel oil is mounted to an upper wall of a tank body, said valve mounting structure comprising:

a welding flange provided on a cover welded to an outer periphery of an opening defined in the upper wall of said tank body made of a synthetic resin, so that said cover covers said opening, said cover and said tank body being made of synthetic resin; and a fixing flange provided at an upper portion of a protector for supporting the float case of said float valve by a concavo-convex engagement, said fixing flange being fixed between the outer periphery of said opening of said tank body and said welding flange of said cover, wherein said protector has a swelling rate less than those of said tank body and said cover.

* * * * *